United States Patent
Gradus et al.

(10) Patent No.: US 12,431,948 B2
(45) Date of Patent: Sep. 30, 2025

(54) LOWER BOUND ON USERS' SPEED FOR EFFICIENT SRS RESOURCE HANDLING FOR MU-MIMO TRANSMISSION

(71) Applicant: Parallel Wireless, Inc., Nashua, NH (US)

(72) Inventors: Nimrod Gradus, Givatayim (IL); Ido Shaked, Alfei Menashe (IL); Ori Shmuel, Herzliya (IL)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 18/346,780

(22) Filed: Jul. 3, 2023

(65) Prior Publication Data

US 2024/0007153 A1  Jan. 4, 2024

Related U.S. Application Data

(60) Provisional application No. 63/357,812, filed on Jul. 1, 2022.

(51) Int. Cl.
| | | |
|---|---|---|
| *H04B 7/04* | (2017.01) | |
| *H04B 7/0452* | (2017.01) | |
| *H04W 72/0446* | (2023.01) | |
| *H04W 72/23* | (2023.01) | |

(52) U.S. Cl.
CPC ...... *H04B 7/0452* (2013.01); *H04W 72/0446* (2013.01); *H04W 72/23* (2023.01)

(58) Field of Classification Search
CPC .. H04B 7/0452; H04W 72/23; H04W 56/004; H04W 64/006; H04W 72/0446
See application file for complete search history.

(56) References Cited

U.S. PATENT DOCUMENTS

| | | | |
|---|---|---|---|
| 9,140,557 B2* | 9/2015 | Taylor, Jr. | G01C 21/1652 |
| 2023/0076030 A1* | 3/2023 | Baek | H04W 24/10 |
| 2023/0097142 A1* | 3/2023 | Alfarhan | H04L 1/1861 370/329 |

OTHER PUBLICATIONS

Li et al. : "Massive MIMO with Multi-Antenna Users: When are Additional User Antennas Beneficial?", Mar. 30, 2016.
Mathworks Help Center: "PDSCH Port 5 UE-Speci2c Beamforming", downloaded Feb. 10, 2025, https://www.mathworks.com/help/lte/ug/pdsch-port-5-ue-specific-beamforming.html.

(Continued)

*Primary Examiner* — Dac V Ha
(74) *Attorney, Agent, or Firm* — Michael Y. Saji

(57) ABSTRACT

A method of determining a lower bound on users' speed for efficient SRS resource handling for MU-MIMO transmission includes determining an eNodeB (eNB) or gNodeB (gNB) timing of a subframe; determining a User Equipment (UE) timing of the subframe; calculating a timing advance type corresponding to a Round Trip Time (RTT); calculating a distance to a base station corresponding to the Round Trip Time (RTT); calculating a distance traveled by a UE between two points based on the distance to the base station; calculating a user speed based on the distance traveled by the UE; deriving a lower bound based on the user speed; and filtering users that exceed the lower bound on user speed. The filtered users may be not assigned SRS. The non-filtered users may be assigned SRS and may subsequently be sent MU-MIMO transmissions.

13 Claims, 5 Drawing Sheets

(56) References Cited

OTHER PUBLICATIONS

Wikipedia: "Zero-forcing precoding", downloaded Feb. 4, 2025, https://en.wikipedia.org/wiki/Zero-forcing_precoding#cite_note-2.
"5G; Study on channel model for frequencies from 0.5 to 100 Ghz (3GPP TR 38.901 version 14.3.0 Release 14)", ETSI TR 138 901 V14.3.0 (Jan. 2018).
"5G; NR; Physical channels and modulation", (3GPP TS 38.211 version 16.2.0 Release 16), ETSI TS 138 211 V16.2.0 (Jul. 2020).
"5G; NR; Overall description; Stage-2", (3GPP TS 38.300 version 15.5.0 Release 15). ETSI TS 138 300 V15.5.0 (May 2019).
"5G; NR; Radio Resource Control (RRC); Protocol specification", (3GPP TS 38.331 version 17.0.0 Release 17), ETSI TS 138 331 V17.0.0 (May 2022).

* cited by examiner

… (1)

LOWER BOUND ON USERS' SPEED FOR EFFICIENT SRS RESOURCE HANDLING FOR MU-MIMO TRANSMISSION

CROSS-REFERENCE TO RELATED APPLICATIONS

This application claims the benefit of priority under 35 US.C. § 119(e) to U.S. Provisional Patent App. No. 63/357,812, having the same title as the present application and filed Jul. 1, 2022, which is also hereby incorporated by reference in its entirety for all purposes. In addition, the present application hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes, having, respectively. This document also hereby incorporates by reference U.S. Pat. Nos. 9,107,092, 8,867,418, and 9,232,547 in their entirety. This document also hereby incorporates by reference U.S. patent application Ser. No. 14/822,839, U.S. patent application Ser. No. 15/828,427, U.S. Pat. App. Pub. Nos. US20170273134A1, US20170127409A1 in their entirety.

BACKGROUND 5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Multi-User MIMO (MU-MIMO) is a key technique in wireless for enhancing the overall system capacity and achieving higher data rates. A substantial cost of using MU-MIMO scheduling schemes is the fact that accurate channel state information is needed at the BS to properly serve the scheduled MU-MIMO users. Such channel state information is inherently sensitive to the users' fading channel characteristic and therefore is much affected by the users' movement speed. One of the methods of evaluating the UE's channel is the use of Sounding Reference Signals (SRS), however there is a limitation on the SRS resources, giving rise to the fact only a subset of UEs can be given such resources. In this invention we shall present an algorithm for providing a lower bound of users' movement speed based on time advance (TA) measurements, to act as a filtering criterion which users should be candidates for MU-MIMO transmission and therefore should be allocated for SRS. MU-MIMO and beamforming are present in 4G as well as 5G, with differing levels of complexity.

MU-MIMO scheduling is an important feature in present and future wireless connectivity, specifically, with the 5G and Massive-MIMO (MA-MIMO) technologies being deployed in today's systems. In MU-MIMO, the scheduler entity in the base station transmits data simultaneously to multiple UEs on the same time/frequency resource, requiring the estimation of each user channel, and therefore the use of SRSs.

SUMMARY

Figure 1:
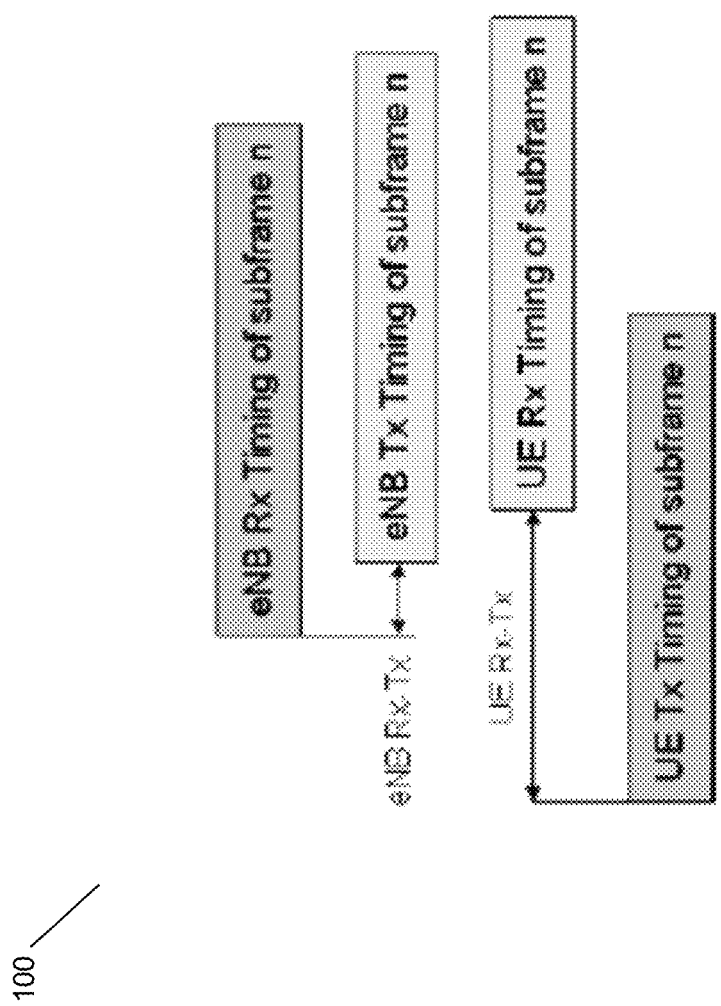
FIG. 1 schematically shows an eNB Rx-Tx delay time and a UE Rx-Tx delay time, in accordance with some embodiments.

This invention utilizes an algorithm for providing a lower bound of users' movement speed based on time advance (TA) measurements, to act as a filtering criterion which users should be candidates for MU-MIMO transmission and therefore should be allocated for SRS.

In one embodiment, a method of determining a lower bound on users' speed for efficient SRS resource handling for MU-MIMO transmission includes determining an eNodeB (eNB) or gNodeB (gNB) timing of a subframe; determining a User Equipment (UE) timing of the subframe; calculating a timing advance type corresponding to a Round Trip Time (RTT); calculating a distance to a base station corresponding to the Round Trip Time (RTT); calculating a distance traveled by a UE between two points based on the distance to the base station; calculating a user speed based on the distance traveled by the UE; deriving a lower bound based on the user speed; and filtering users that exceed the lower bound on user speed. The filtered users may be not assigned SRS. The non-filtered users may be assigned SRS and may subsequently be sent MU-MIMO transmissions.

In another embodiment, a method is disclosed wherein for each period, for example for a single transport time interval (TTI), the sequence of steps may include: determining a lower bound for each UE's velocity using the steps described above in relation to FIG. 2; comparing the determined lower bound to an MU-MIMO effectiveness threshold to perform filtering; sending a message indicating whether or not MU-MIMO is recommended, e.g., from a Near-RT RIC to a base station or from a CU to a DU; and, if MU-MIMO is recommended, scheduling SRS transmission.

DETAILED DESCRIPTION

Channel state acquisition based on SRS for MU-MIMO transmission requires allocating SRS resources to the users. This allocation is a function of the number of receive antennas as well as the coherence time of the channel. Since the SRS resources are expensive, it is not a realistic approach to provide allocation for all users in the system. Thus, a decision of which users to consider for this allocation needs to be made. This invention considers the problem of user filtering from the pool of users to be allocated with SRS resources. This problem is of great importance as it saves system's resources as well as reducing the search space for any user grouping algorithm.

To deal with the problem of user selection, making sure that SRS resources can be allocated to each UE in the selected group, while utilizing the MU-MIMO scheduling performance, and, motivated by the fact that static UEs would most likely gain from the use of MU-MIMO transmission, we devised an algorithm that provide a lower bound for the users' movement speed based on their TA estimation, specifically TA type 1. In turn, given the lower bound on the users' movement speed, according to the required use case, a decision of which users should not be considered for MU-MIMO transmission can be taken. With 3GPP release 9, TA measurement has been enhanced, so that type 1 measurement is introduced and defined as the sum of the receive-transmit timing difference at the eNB and the receive-transmit timing difference at the UE. The base station measures first its own timing difference and reports to the device to correct its uplink timing per Timing Advance (TA) command, a MAC feature. The UE measures and reports it receive-transmit timing difference as well, as shown in the following figure.

FIG. 1 schematically shows an eNB Rx-Tx delay time and a UE Rx-Tx delay time, in accordance with some embodiments.

Both timing differences allow the calculation of the Timing Advance Type 1, i.e., $$TA_{Type1} = (eNB\ Rx-Tx) + (UE\ Rx-Tx)$$

corresponding to the Round Trip Time (RTT). The RTT can be used for calculation of the distance to the base station through the following equation, $$d_t = c * \frac{RTT}{2}$$

Where c is the speed of light and $d_t$ is the calculated distance to the base station at time t.

Figure 2:
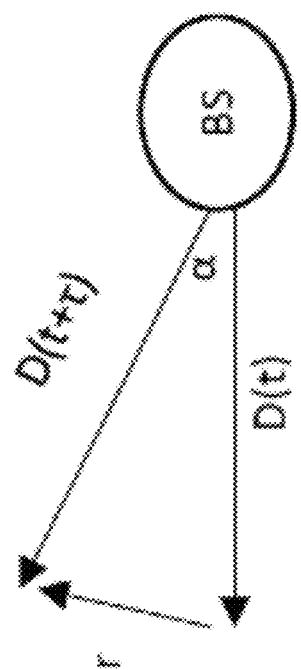
FIG. 2 is a schematic diagram showing the relationship of delay time to distance, in accordance with some embodiments.

FIG. 2 is a schematic diagram showing the relationship of delay time to distance, in accordance with some embodiments. FIG. 2 shows calculation of the distance between the two points in time. Our algorithm shall calculate the distances of two points in time $d_t$ and $d_{t+\tau}$ from the base station to the user, where $\tau$ is a single time unit which for ease of notation is considered as 1 second. Thus, assuming r is the distance the user did between the two points and that the user is moving in a straight line with constant speed (a reasonable assumption for a time unit $\tau$), his speed can be calculated by $$v = \frac{r}{\tau}$$

(see FIG. 2). To derive a lower bound on the user speed, noting that, $r^2 = d_t^2 + d_{t+\tau}^2 - 2d_t d_{t+\tau} \cos \alpha$, derived from the low of cosine and assuming $\alpha$ is less than 90 degrees, we have $$r \geq \sqrt{d_t^2 - d_{t+1}^2 - 2d_t d_{t+1}} \geq \sqrt{(d_t - d_{t+1})^2}$$

and therefore, $$r \geq |d_t - d_{t+1}| \rightarrow v \geq |d_t - d_{t+1}|$$

Given a maximal allowed speed, $v^{max}$ for MU-MIMO scheduling set by the system, using the above lower bound on the user speed, a system can filter users that exceeds the allowed speed. I.e., all users with $|d_t - d_{t+1}| > v^{max}$ shall not be considered.

Figure 3:
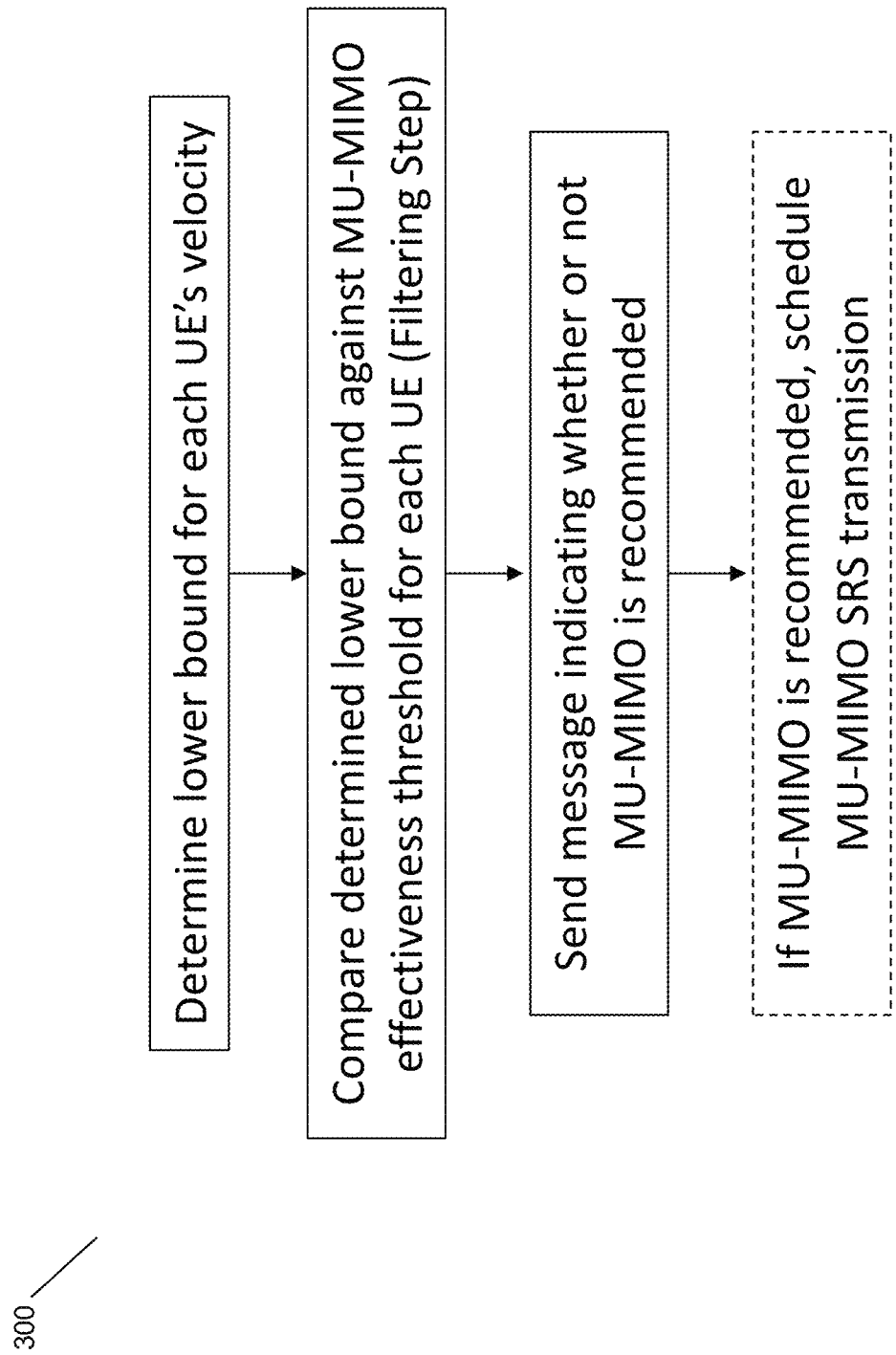
FIG. 3 is a flow diagram showing steps performed in accordance with some embodiments.

FIG. 3 is a flow diagram showing steps performed in accordance with some embodiments. For each period, for example for a single transport time interval (TTI), the sequence of steps may include: determining a lower bound for each UE's velocity using the steps described above in relation to FIG. 2; comparing the determined lower bound to an MU-MIMO effectiveness threshold to perform filtering; sending a message indicating whether or not MU-MIMO is recommended, e.g., from a Near-RT RIC to a base station or from a CU to a DU; and, if MU-MIMO is recommended, scheduling SRS transmission.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

Figure 4:
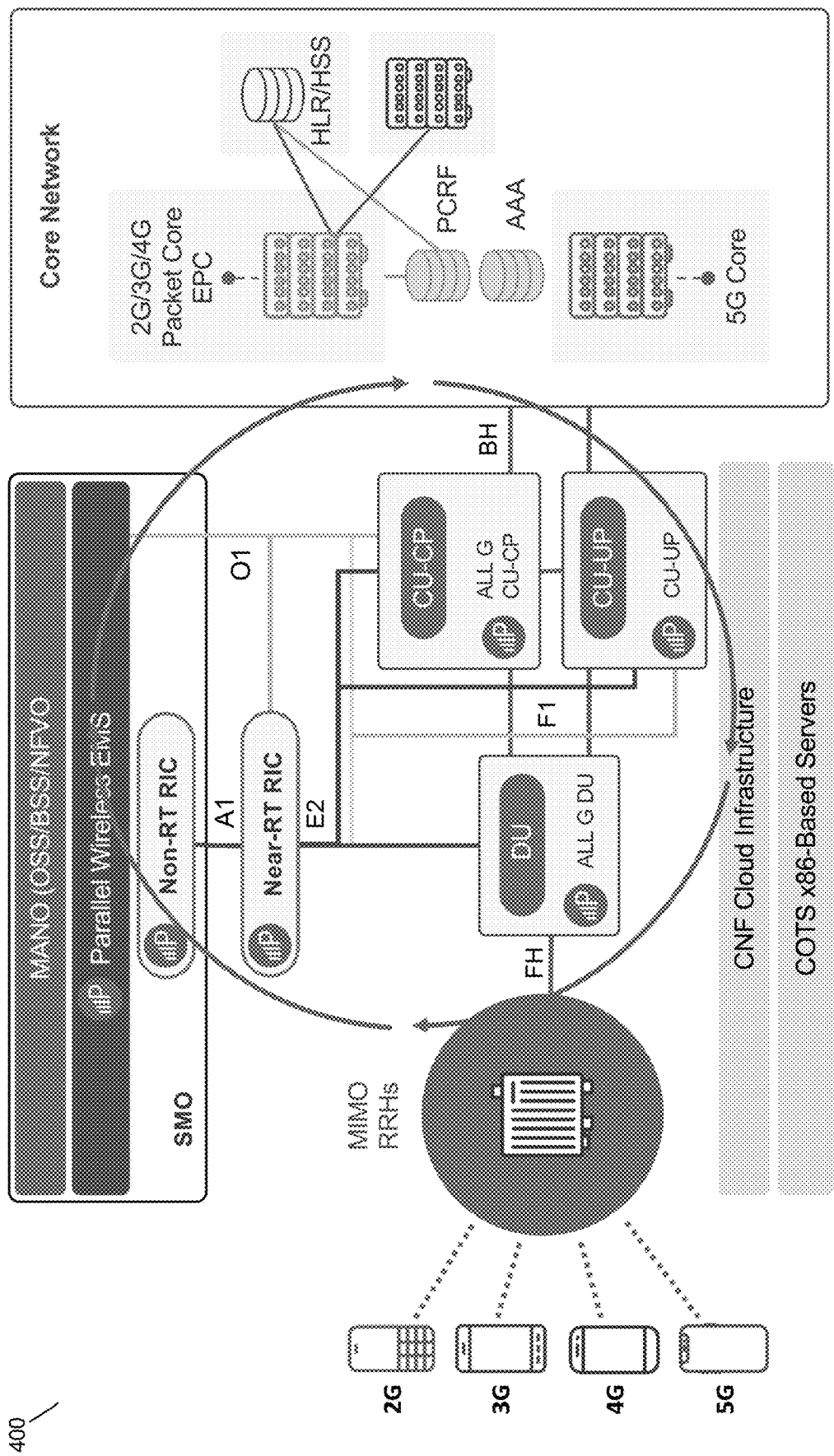
FIG. 4 is a schematic diagram of a multi-RAT RAN deployment architecture, in accordance with some embodiments.

FIG. 4 is a schematic diagram of a multi-RAT RAN deployment architecture, in accordance with some embodiments. Multiple generations of UE are shown, connecting to RRHs that are coupled via fronthaul to an all-G Parallel Wireless DU. The all-G DU is capable of interoperating with an all-G CU-CP and an all-G CU-UP. Backhaul may connect to the operator core network, in some embodiments, which may include a 2G/3G/4G packet core, EPC, HLR/HSS, PCRF, AAA, etc., and/or a 5G core. In some embodiments an all-G near-RT RIC is coupled to the all-G DU and all-G CU-UP and all-G CU-CP. Unlike in the prior art, the near-RT RIC is capable of interoperating with not just 5G but also 2G/3G/4G.

The all-G near-RT RIC may perform processing and network adjustments that are appropriate given the RAT. For example, a 4G/5G near-RT RIC performs network adjustments that are intended to operate in the 100 ms latency window. However, for 2G or 3G, these windows may be extended. As well, the all-G near-RT RIC can perform configuration changes that takes into account different network conditions across multiple RATs. For example, if 4G is becoming crowded or if compute is becoming unavailable, admission control, load shedding, or UE RAT reselection may be performed to redirect 4G voice users to use 2G instead of 4G, thereby maintaining performance for users. As well, the non-RT RIC is also changed to be a near-RT RIC, such that the all-G non-RT RIC is capable of performing network adjustments and configuration changes for individual RATs or across RATs similar to the all-G near-RT RIC. In some embodiments, each RAT can be supported using processes, that may be deployed in threads, containers, virtual machines, etc., and that are dedicated to that specific RAT, and, multiple RATs may be supported by combining them on a single architecture or (physical or virtual) machine. In some embodiments, the interfaces between different RAT processes may be standardized such that different RATs can be coordinated with each other, which may involve interworking processes or which may involve supporting a subset of available commands for a RAT, in some embodiments. Where "all-G" is specified it is understood that various combinations of radio access technologies, or Gs, may be combined and that not all of 2G/3G/4G/5G/Wi-Fi are required to be present in each embodiment.

Figure 5:
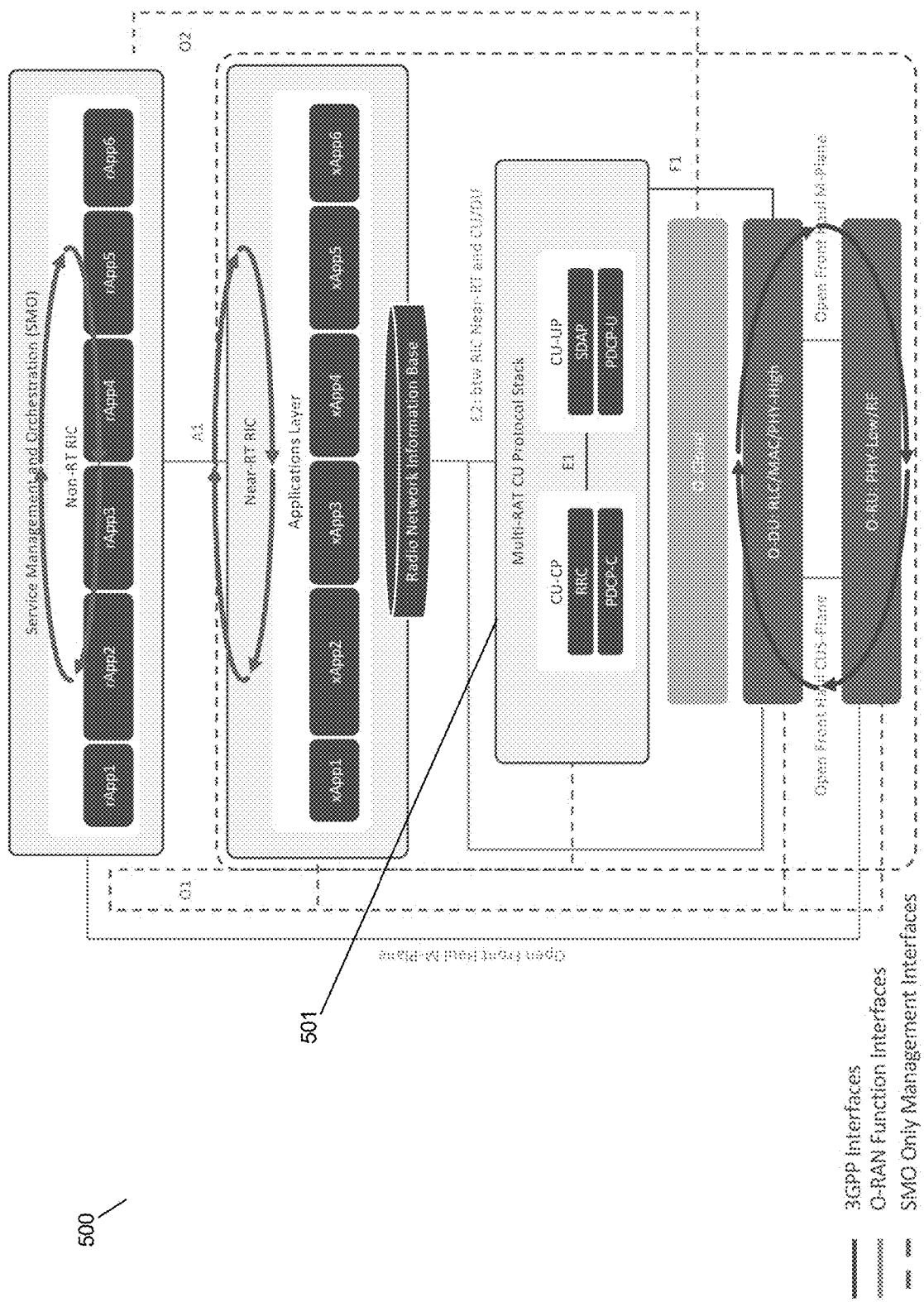
FIG. 5 is an additional schematic diagram of a multi-RAT RAN deployment architecture, in accordance with some embodiments.

FIG. 5 is an additional schematic diagram of a multi-RAT RAN deployment architecture, in accordance with some embodiments. The multi-RAT CU protocol stack 501 is configured as shown and enables a multi-RAT CU-CP and multi-RAT CU-UP, performing RRC, PDCP, and SDAP for all-G. As well, some portion of the base station (DU or CU) may be in the cloud or on COTS hardware (O-Cloud), as shown. Coordination with SMO and the all-G near-RT RIC and the all-G non-RT RIC may be performed using the A1 and O2 function interfaces, as shown and elsewhere as specified by the ORAN and 3GPP interfaces for 4G/5G. The non-RT RIC and the near-RT RIC coordinate; xApps run on the near-RT RIC and rApps run on the non-RT RIC, each virtualized in containers, in some embodiments.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

In any of the scenarios described herein, where processing may be performed at the cell, the processing may be performed at a centralized unit (CU), a distributed unit (DU), a radio unit (RU), as desired based on the particular deployment architecture. In some embodiments, portions or all of the processing may be performed at a near-real time RAN intelligent controller (near-RT RIC); for example, the calculation and algorithm described herein above may be performed as an rApp executing on the near-RT RIC and may provide a feedback message or signal to the near-RT RIC such that a MU-MIMO mode of operation is not used and/or that MU-MIMO is not scheduled for the specific UE.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods are described in reference to the 5G New Radio (5G NR) and Long Term Evolution (LTE) standards, one of skill in the art would understand that these systems and methods could be adapted for use with other wireless standards or versions thereof. The inventors have understood and appreciated that the present disclosure could be used in conjunction with various network architectures and technologies. Wherever a 4G/5G technology is described, the inventors have understood that other RATs have similar equivalents, such as a 2G nodeB for 2G equivalent of eNB. Wherever an MME is described, the MME could be a 3G RNC or a 5G AMF/SMF. Additionally, where a 5G Near-RT RIC is described, any other node in the core network could be used in an equivalent or analogous way, for example, by managing 5G gNBs using a 4G EPC core in a non-standalone (NSA) deployment architecture using, e.g., MMEs or coordinating servers, or network functions operating co-located with other EPC nodes, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

In some embodiments, the software needed for implementing the methods and procedures described herein may be implemented in a high level procedural or an object-oriented language such as C, C++, C #, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A method of determining a lower bound on users' speed for efficient Sounding Reference Signal (SRS) Resource handling for Multi-User Multiple In Multiple Out (MU-MIMO) transmission, comprising:
   determining an eNodeB (eNb) timing of a subframe;
   determining a User equipment (UE) timing of the subframe;
   calculating a timing advance type corresponding to a Round Trip Time (RTT);
   calculating a distance to a base station corresponding to the Round Trip Time (RTT);
   calculating an estimated distance traveled by a User between two points based on the distance to the base station;
   calculating a user speed based on the estimated distance traveled by the User;
   deriving a lower bound based on the user speed; and
   filtering users that exceed the lower bound on user speed.

2. The method of claim 1, further comprising performing channel state acquisition using Sounding Reference Signals (SRS) to allocate SRS resources to users based on movement speed.

3. The method of claim 1, wherein the lower bound of users' movement speed is determined using Timing Advance (TA) measurements.

4. The method of claim 1, further comprising using beamforming to enhance data transmission efficiency by directing radio waves to the User's user equipment (UE).

5. The method of claim 1, further comprising supporting one or more of Long Term Evolution (LTE) and 5G UEs.

6. A non-transitory computer-readable medium comprising instructions for Sounding Reference Signal (SRS) resource handling that, when executed on a processor in a cellular network equipment, cause the processor to perform steps, the steps further comprising:
   determining an eNodeB (eNb) timing of a subframe;
   determining a User equipment (UE) timing of the subframe;
   calculating a timing advance type corresponding to a Round Trip Time (RTT);
   calculating a distance to a base station corresponding to the Round Trip Time (RTT);
   calculating an estimated distance traveled by a User between two points based on the distance to the base station;
   calculating a user speed based on the estimated distance traveled by the User;
   deriving a lower bound based on the user speed; and
   filtering users that exceed the lower bound on user speed.

7. The non-transitory computer-readable medium of claim 6, the steps further comprising performing channel state acquisition using Sounding Reference Signals (SRS) to allocate SRS resources to users based on movement speed.

8. A method of determining a lower bound on users' speed for efficient Sounding Reference Signal (SRS) Resource handling for Multi-User Multiple In Multiple Out (MU-MIMO) transmission, comprising:
- determining an eNodeB (eNb) timing of a subframe;
- determining a User equipment (UE) timing of the subframe;
- calculating a timing advance type corresponding to a Round Trip Time (RTT);
- calculating a distance to a base station corresponding to the Round Trip Time (RTT);
- calculating an estimated distance traveled by a User between two points based on the distance to the base station;
- calculating a user speed based on the estimated distance traveled by the User; and
- deriving a lower bound based on the user speed.

9. The method of claim 8, further comprising filtering users that exceed the lower bound on user speed.

10. The method of claim 8, further comprising performing channel state acquisition using Sounding Reference Signals (SRS) to allocate SRS resources to users based on movement speed.

11. The method of claim 8, wherein the lower bound of users' movement speed is determined using Timing Advance (TA) measurements.

12. The method of claim 8, further comprising using beamforming to enhance data transmission efficiency by directing radio waves to the User's user equipment (UE).

13. The method of claim 8, further comprising supporting one or more of Long Term Evolution (LTE) and 5G UEs.

* * * * *